United States Patent
Yabe et al.

(10) Patent No.: US 6,714,640 B1
(45) Date of Patent: Mar. 30, 2004

(54) COMMUNICATION SYSTEM, EXCHANGE AND EXTENSION CALL PROCESSING METHOD

(75) Inventors: Hiroki Yabe, Koriyama (JP); Hideo Kobayashi, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/272,354

(22) Filed: Mar. 19, 1999

(30) Foreign Application Priority Data

Mar. 20, 1998 (JP) .......................... 10-071947

(51) Int. Cl.[7] .......................... H04M 5/00; H04M 3/00; H04M 3/42; H04J 1/14
(52) U.S. Cl. .................. 379/242; 379/198; 379/211.01; 379/212.01; 370/496
(58) Field of Search ................. 379/242, 225, 379/233, 212.01, 211.01, 198; 370/356, 62, 496

(56) References Cited

U.S. PATENT DOCUMENTS

| | | | | |
|---|---|---|---|---|
| 5,099,511 A | * | 3/1992 | Matsumoto | 379/198 |
| 5,268,958 A | * | 12/1993 | Nakano | 379/211.01 |
| 5,305,313 A | * | 4/1994 | Katoh | 370/62 |
| 5,572,585 A | * | 11/1996 | Tsutsui | 379/242 |
| 5,649,004 A | * | 7/1997 | Ikeno et al. | 379/212.01 |
| 5,659,542 A | * | 8/1997 | Bell et al. | 370/496 |
| 5,815,564 A | * | 9/1998 | Tsuzuki et al. | 379/233 |
| 6,088,438 A | * | 7/2000 | Yoo | 379/225 |
| 6,233,234 B1 | * | 5/2001 | Curry et al. | 370/356 |

* cited by examiner

*Primary Examiner*—Ahmad F. Matar
*Assistant Examiner*—Thjuan P Knowlin
(74) *Attorney, Agent, or Firm*—Antonelli, Terry, Stout & Kraus, LLP

(57) ABSTRACT

Each of ISDN extension terminals which are connected in a point-multipoint connection mode transmits call initiation information while identification information thereof is contained in the call initiation information when a call is initiated: a private branch exchange includes a main memory for storing a table representing the corresponding relationship between the extension number and service class information, and a central processing equipment for searching the service class information corresponding to the extension number contained in call initiation information from the table when the call initiation information is received from an extension, and performing call processing in accordance with the service class information thus searched, whereby even when a plurality of extension terminals are connected to an exchange in the point-multipoint connection mode, the service class management can be performed for every extension terminal.

6 Claims, 9 Drawing Sheets

EXCHANGE PROCESSING MEMORY

EXTENSION NUMBER - ACCOMMODATION POSITION MANAGEMENT TABLE

EXTENSION NUMBER - ACCOMMODATION POSITION MANAGEMENT TABLE

| EXTENSION NUMBER = a0 |
| --- |
| ACCOMMODATION POSITION = A |
| ETC |

} FOR ONE EXTENSION

EXTENSION NUMBER – SERVICE CLASS INFORMATION MANAGEMENT TABLE

CALL CONTROL DATA

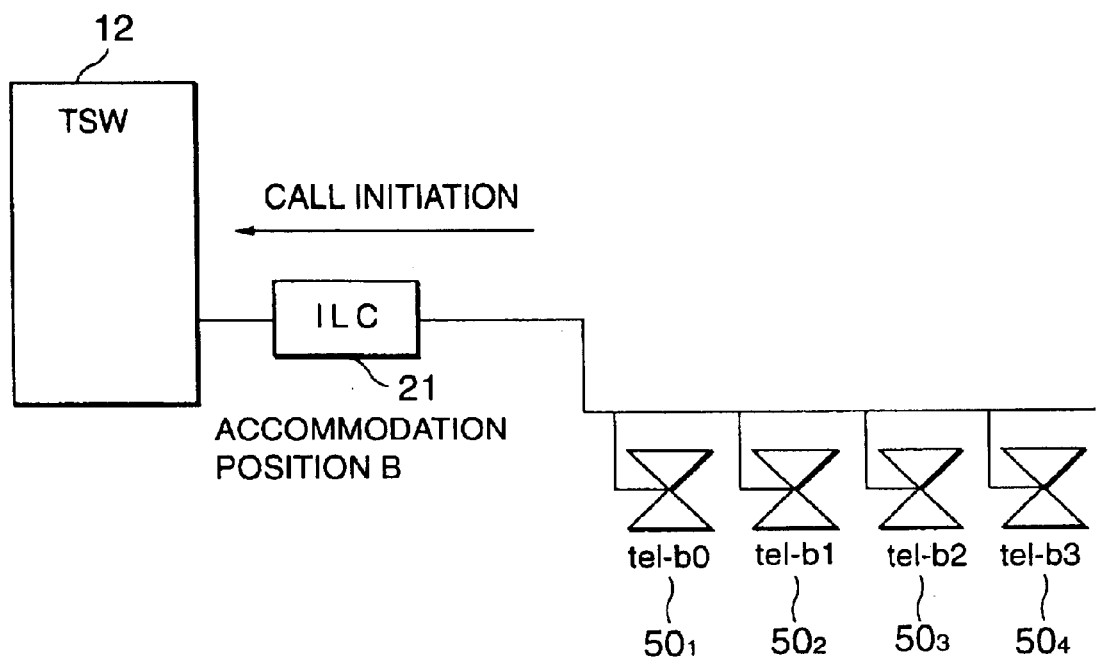

FIG.15

EXTENSION SERVICE CLASS MANAGEMENT TABLE

| EXTENSION NUMBER = b1 |
| --- |
| BUSINESS/GUEST ROOM CLASS |
| INTERRUPT CLASS |
| ETC |

} FOR ONE EXTENSION

FIG.16

CALL CONTROL DATA

| EXTENSION NUMBER = b1 |
| --- |
| CALL STATUS NUMBER = CALL INITIATION |
| ACCOMMODATION POSITION = C |
| ETC |

} tel-b1 EXTENSION INFORMATION

COMMUNICATION SYSTEM, EXCHANGE AND EXTENSION CALL PROCESSING METHOD

BACKGROUND OF THE INVENTION

1. Field of the Invention

The present invention relates to a communication system including an exchange and a plurality of extension terminals accommodated in the exchange, and particularly to an extension call processing technique in a communication system in which a plurality of extension terminals are connected to an exchange in a point-multipoint connection mode.

2. Description of Related Art

A communication system including a private branch exchange and a plurality of extension terminals accommodated in the private branch exchange has become widely popular in working places, etc. Further, recent propagation of ISDN (INTEGRATED SERVICES DIGITAL NETWORK) has also promoted the development and propagation of ISDN extension terminals which can connect to a private branch exchange in a point-multipoint connection mode by using ISDN as an extension terminal.

a conventional communication system, a service class management of extension terminals is performed by conducting call processing in accordance with class information which is predetermined every accommodation position of the extension terminal. The service class management means the management of functions which can be performed by extension terminals, such as connection control to a public line and control of other services. Further, the service class information means information required to perform service class management such as business/guest room class, interrupt class, etc.

When plural ISDN extension terminals are connected to a private branch exchange in the point-multipoint connection mode in the conventional communication system as described above, all of these ISDN extension terminals are class-managed on the basis of the same service class information because they have the same accommodation position.

Therefore, there occurs a problem that the service class management which is different for every terminal cannot be performed on the plural ISDN extension terminals which are connected to the exchange in the point-multipoint connection mode.

SUMMARY OF THE INVENTION

The present invention has been implemented in view of the foregoing situation, and has an object to perform the service class management for every extension terminal even when plural extension terminals are connected to an exchange in the point-multipoint connection mode.

In order to attain the above object, according to a first aspect of the present invention, a communication system comprising an exchange and a plurality of extension terminals accommodated in the exchange, is characterized in that each of the extension terminals includes means for transmitting call-initiation information while identification information is contained in the call-initiation information when a call is initiated, and the exchange includes memory means for storing a table representing corresponding relationship between the identification information of the extension terminal and service class information, and call processing means for searching from the table the service class information corresponding to the identification information contained in the call-initiation information when the call-initiation information concerned is received from the extension terminal, and performing call processing in accordance with the service class information thus searched.

Further, according to a second aspect of the present invention, a communication system comprising an exchange and a plurality of extension terminals accommodated in the exchange, is characterized in that at least one of the plural extension terminals includes means for transmitting call-initiation information while identification information is contained in the call-initiation information when a call is initiated, and the exchange includes memory means for storing a table representing corresponding relationship between the identification information of the extension terminal and the service class information, and call processing means for judging whether the identification information is contained in the call-initiation information when receiving the call-initiation information from the extension terminal, and searching the service class information corresponding to the identification information concerned from the table to perform the call processing on the basis of the searched service class information when the identification information concerned is contained in the call-initiation information, or performing the call processing on the basis of predetermined service class information in accordance with an accommodation position at which the call-initiation information is received when no identification information is contained in the call-initiation information.

In the present invention, when identification information is contained in call-initiation information transmitted from an extension terminal, the service class information corresponding to the identification information concerned is searched from the table, and the call processing is carried out on the basis of the service class information thus searched. Accordingly, even when plural extension terminals are connected to the exchange in the point-multipoint connection mode, the service class management can be performed for every extension terminal.

BRIEF DESCRIPTION OF THE DRAWINGS

FIG. 11 is a diagram showing a state where a call is initiated from an ISDN extension terminal $50_2$ connected to an ISDN extension circuit 21;

FIG. 12 is a diagram showing an extension number b1 and the service class information associated with the extension number b1, which are registered in the extension number-service class information management table;

FIG. 15 is a diagram showing the extension number b1 and the service class information associated with it, which are registered in the extension number-service class information management table;

FIG. 16 is a diagram showing the extension number b1, the accommodation position C, the call state number, etc., which are temporarily stored as call control data.

DETAILED DESCRIPTION OF THE PREFERRED EMBODIMENT

A preferred embodiment according to the present invention will be described hereunder with reference to the accompanying drawings.

Figure 1:
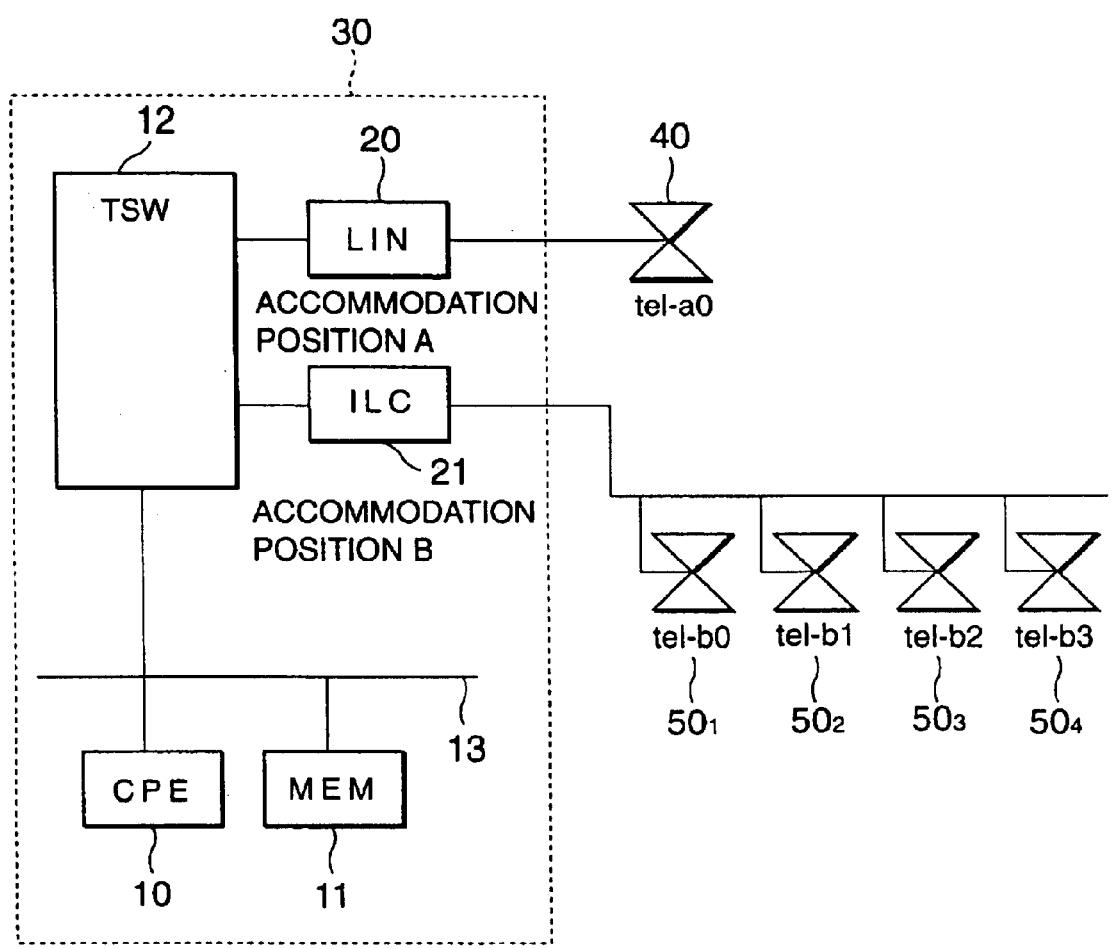
FIG. 1 is a schematic diagram showing a communication system to which an embodiment of the present invention is applied.

FIG. 1 is a diagram showing the constitution of a communication system to which an embodiment of the present invention is applied.

As shown in FIG. 1, the communication system of this embodiment includes a private branch exchange 30, an extension terminal 40 accommodated in the private branch exchange 30 so as to be connected to the private branch exchange 30 in a point-point connection mode, ISDN extension terminals $50_1$ to $50_4$ which are accommodated in the private branch exchange 30 so as to be connected to the private branch exchange 30 in a point-multipoint connection mode.

Here, it is assumed that an extension number a0 is given to the extension terminal 40 and extension numbers b0 to b3 are given to the ISDN extension terminals $50_1$ to $50_4$.

The extension terminal 40 is basically similar to a general extension terminal (extension telephone) which has been hitherto used, and the detailed description thereof is omitted.

When a call is initiated, each of the ISDN extension terminals $50_1$ to $50_4$ transmitted extension number information thereof while it is contained in call-initiation information. This is a point different from the general extension terminal which has been hitherto used. The other points are basically similar to those of the general extension terminal, and the detailed description thereof is omitted as in the case of the extension terminal 40.

The private branch exchange 30 includes a time-divisional switch (TSW) 12 for switching a communication path to another, a line interface circuit (LIN) 20 for connecting the extension terminal 40 to the time-divisional switch 12 by a 2-wire analog interface, an ISDN line interface circuit (ILC) 21 for connecting the ISDN extension terminals $50_1$ to $50_4$ to the time-divisional switch 12 by I-interface, a central processing equipment (CPE) 10, a main memory (MEM) 11, and a central control (CC) bus 13 for connecting the central processing equipment 10 and the main memory 11 to the time-divisional switch 12.

Here, it is assumed that an accommodation position A and an accommodation position B are allocated as accommodation position information to the line interface circuit 20 and the ISDN line interface circuit 21.

Figure 2:
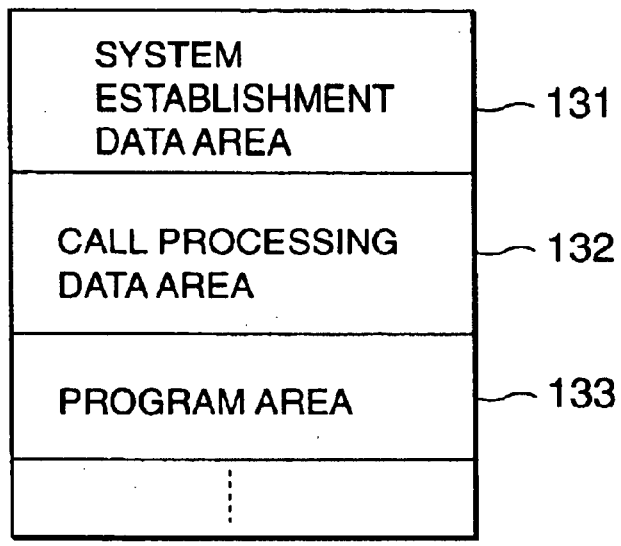
FIG. 2 is a diagram showing the content to be stored in a main memory 11 shown in FIG. 1.

FIG. 2 is a diagram showing the content to be stored in the main memory 11 shown in FIG. 1.

As shown in FIG. 2, the main memory 11 includes a system establishment data area 131, a call processing data area 132, and a program area 133 in which programs to perform various services to be made by the exchange 30, such as a call processing program to perform call processing, etc., are stored.

In the system establishment data area 131 are stored preset fixed information such as an extension number-accommodation position management table representing the corresponding relationship between the extension number and the accommodation position, an extension number-service class information management table representing the corresponding relationship between the extension number and the service class information such as the business/guest room class, interrupt class or the like, etc.

Figure 3:
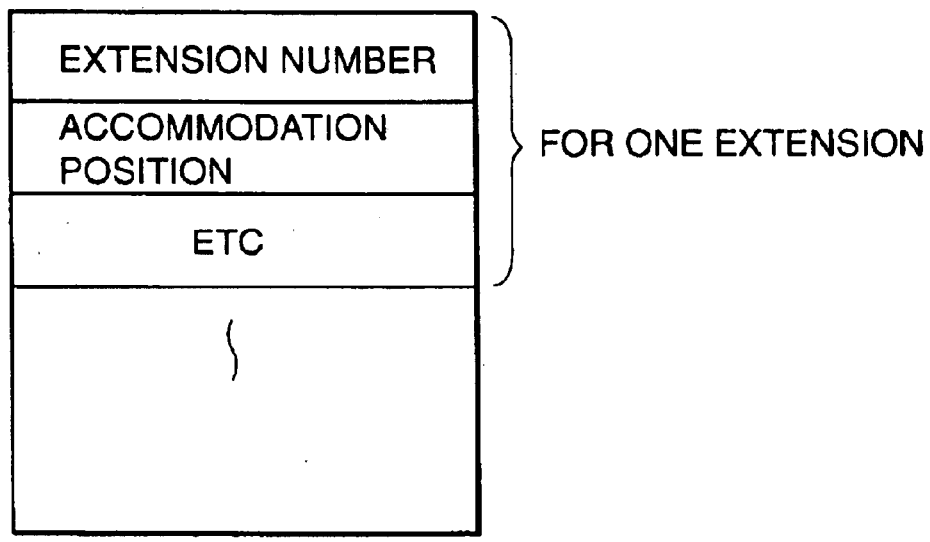
FIG. 3 is a diagram showing an extension number-accommodation position management table stored in a (central) local data area 131 shown in FIG. 2.

FIG. 3 is a diagram showing the extension number-accommodation position management table.

As shown in FIG. 3, the extension number allocated to the extension terminal and the accommodation position allocated to the line interface circuit (the interface circuit 20, the ISDN line interface circuit 21) connected to the extension terminal concerned are stored in association with each other in the extension number-accommodation position management table for every terminal accommodated in the private branch exchange 30 (the extension terminal 40, the ISDN extension terminals $50_1$ to $50_4$).

Figure 4:
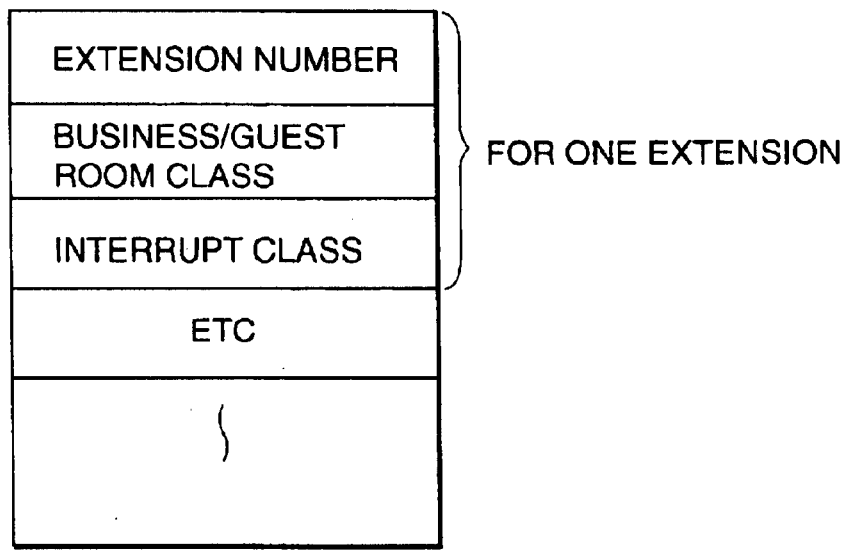
FIG. 4 is a diagram showing an extension number-service class information management table stored in the (central) local data area 131 shown in FIG. 2.

FIG. 4 is a diagram showing an extension-number service class information management table.

As shown in FIG. 4, the extension number allocated to each of the extension terminals (the extension terminal 40, the ISDN extension terminals $50_1$ to $50_4$) accommodated in the private branch exchange 30 and the service class information for managing the functions (such as connection control to a public line) which can be performed by the extension terminal concerned, such as the business/guest room class, the interrupt class, etc., are stored in the extension number-service class information management table so that they are associated with each other.

Further, call control data such as the operating status of the call processing, etc. are temporarily stored in the call processing data area 132.

Figure 5:
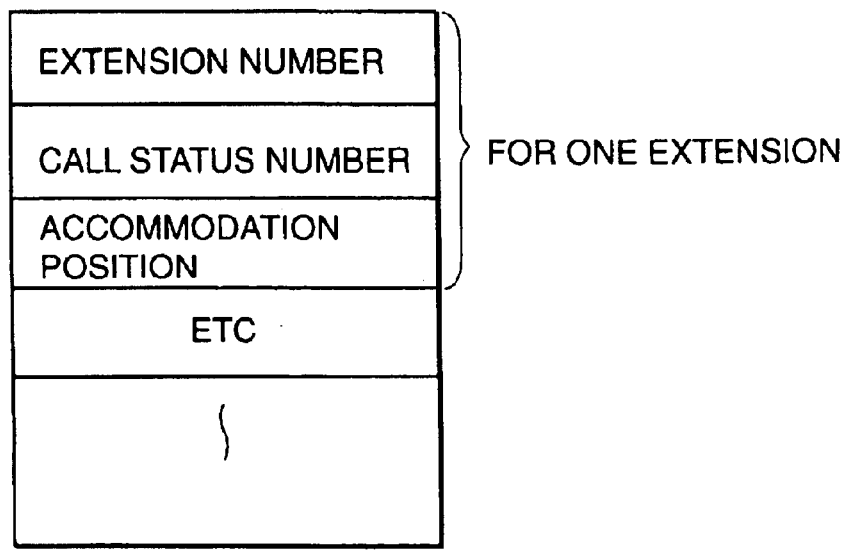
FIG. 5 is a diagram showing call control data stored in a call processing data area 132 shown in FIG. 2.

FIG. 5 is a diagram showing the call control data.

As shown in FIG. 5, the call control data are composed of information to grasp the status transition from an on-hook state to an off-hook state, such as the extension number under call processing, the accommodation position, the call processing number representing the call status.

The central processing equipment 10 executes the program stored in the main memory 11 to control each constituent element of the private branch exchange 30 and each extension terminal accommodated by the private branch exchange 30. Further, the central processing equipment 10 executes the call processing program to perform the call processing when it detects the call-initiation operation of each extension terminal accommodated in the private branch exchange 30.

The call processing carried out when the central processing equipment 10 executes the call processing program will be described.

Figure 6:
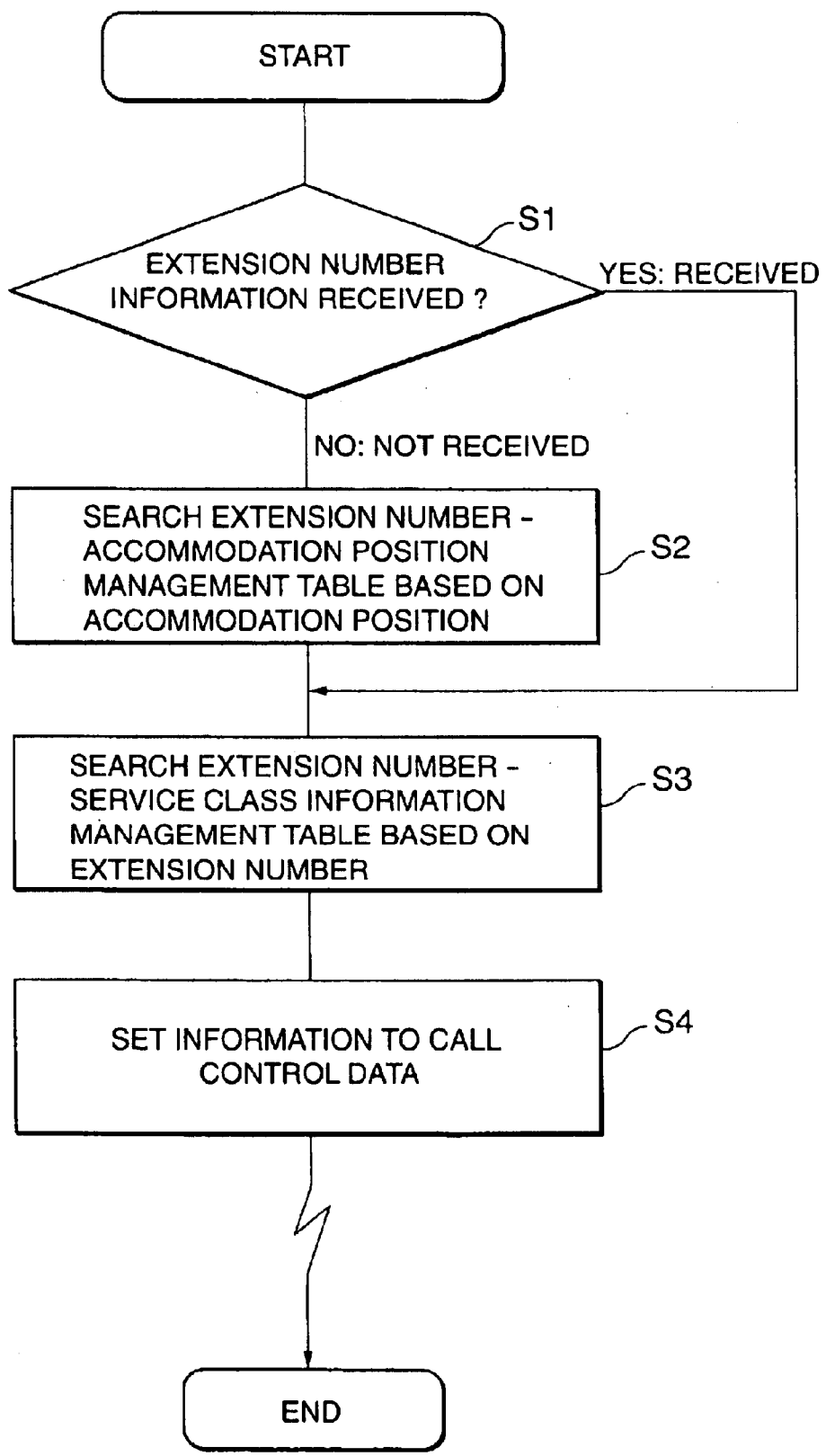
FIG. 6 is a flowchart showing call processing carried out by executing a call processing program by a central processor 10.

FIG. 6 is a flowchart showing the call processing which is carried out when the central processing equipment 10 executes the call processing program.

First, the call processing for the call initiation from the extension terminal 40 connected to the line interface circuit 20 will be described.

The line interface circuit 20 monitors the call initiation of the extension terminal 40. When the extension terminal 40 transits from the on-hook state to the off-hook state to initiate a call as shown in FIG. 7, the line interface circuit 20 detects the transition and notifies the call initiation information containing the accommodation position A thereof to the central processing equipment 10.

Upon receiving the call initiation, the central processing equipment 10 executes the call processing program and goes to step S1 to judge whether the extension number is contained in the call initiation information thus received.

Figures 7, 8:
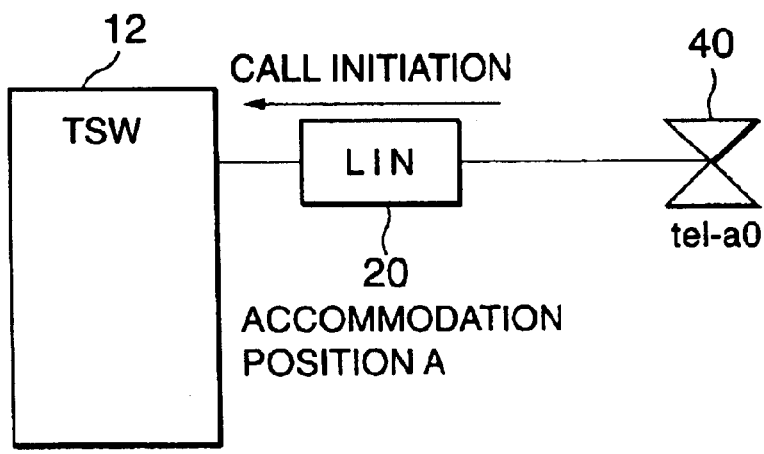
FIG. 7 is a diagram showing a state where a call is initiated from an extension terminal 40 connected to an extension circuit 20.
FIG. 8 is a diagram showing an accommodation position A and the extension number a0 associated with it, which are stored in the extension number-accommodation position management table.

In this case, since no extension number is contained in the call initiation information, the central processing equipment 10 goes to step S2 and obtains the extension number a0 associated with the accommodation position A contained in the call initiation information from the extension number-accommodation position management table stored in the system establishment data area 131 of the main memory 11 as shown in FIG. 8.

Figure 9:
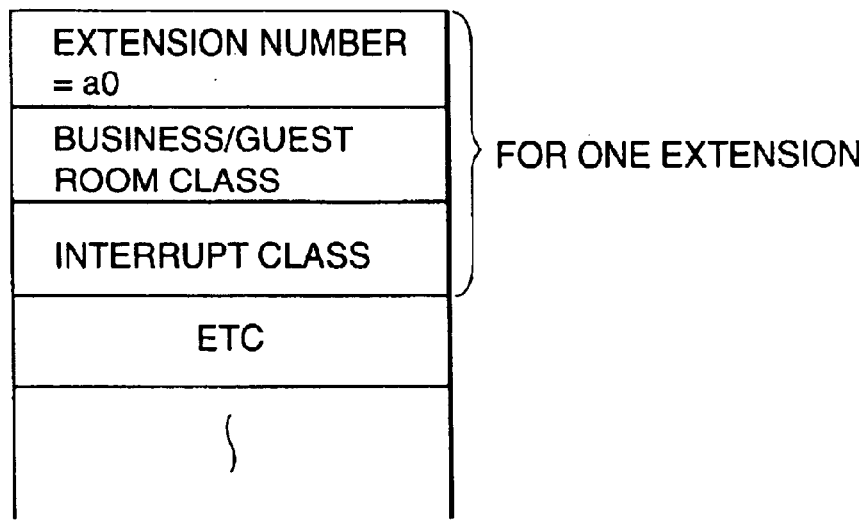
FIG. 9 is a diagram showing the extension number a0 and the service class information associated with it, which are registered in the extension number-service class information management table.

Upon obtaining the extension number a0 associated with the accommodation position A, the central processing equipment 10 goes to step S3, and obtains the service class information (communication connection class, business/guest room class, interrupt class, etc.) associated with the extension number a0 from the extension number-service class information management table stored in the local data area 131 of the main memory 11 as shown in FIG. 9.

Upon obtaining the service class information associated with the extension number a0, the central processing equipment 10 goes to step S4, and performs the call processing according to the service class information thus obtained. For example, when the service class information thus obtained indicates the control of the connection to the public line, the extension terminal 40 is connected to a communication partner only when the extension number is dialed.

Figure 10:
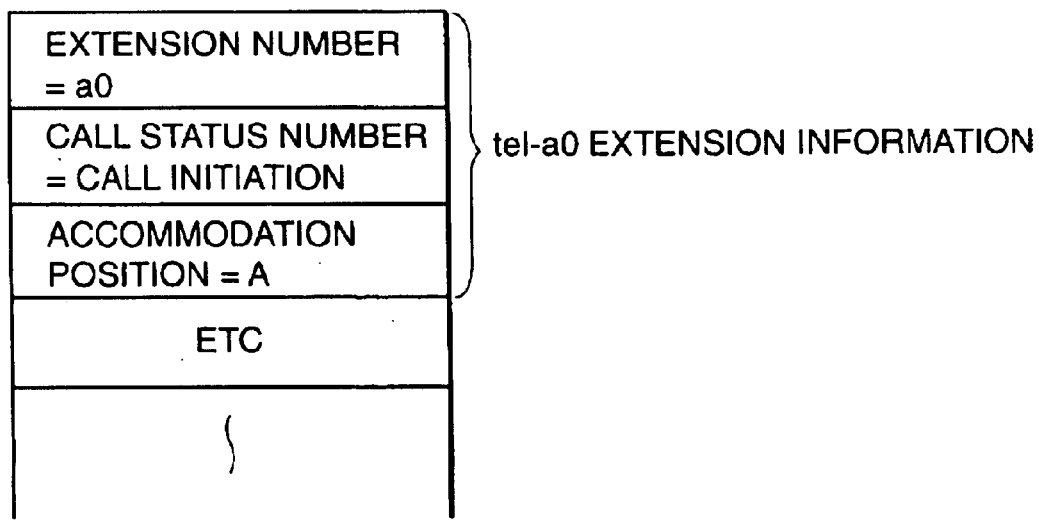
FIG. 10 is a diagram showing information such as the extension number a0, the accommodation position A and the call state number, etc., which are temporarily stored as call control data.

Further, in order to manage the extension terminal a0 under call processing, the central processing equipment 10 stores the extension number a0, the accommodation position A, the call status number (in this case, call initiation), etc. as call control data into the call processing data area 132 of the main memory 11 while these data are associated with one another as shown in FIG. 10.

Next, the call processing for the call initiation from the ISDN extension terminal $50_2$ connected to the ISDN line interface circuit 21 will be described.

The ISDN line interface circuit 21 monitors the call initiation of the ISDN extension terminals $50_1$ to $50_4$. When the ISDN extension terminal $50_2$ notifies the call initiation information containing the extension number b1 thereof to initiate a call as shown in FIG. 11, the ISDN line interface circuit 21 detects the call initiation and notifies the call initiation information to the central processing equipment 10 while the accommodation position B thereof is contained in the call initiation information thus received.

Upon receiving the call initiation information, the central processing equipment 10 executes the call processing program and the central processing equipment 10 goes to step S1 to judge whether the extension number is contained in the call initiation information thus received.

In this case, since the extension number b1 is contained in the call initiation information, the central processing equipment 10 goes to step S3 without executing the step S2, and the central processing equipment 10 obtains the service class information (communication connection class, business/guest room class, interrupt class, etc.) associated with the extension number b1 thus obtained from the extension number-service class information management table stored in the system establishment data area 131 of the main memory 11 as shown in FIG. 12.

Upon obtaining the service class information associated with the extension number b1, the central processing equipment 10 goes to step S4 to perform the call processing in accordance with the service class information thus obtained. For example, when the service class information thus obtained indicates the control of the connection to the public line, the ISDN extension terminal $50_2$ is connected to the communication party only when the extension number is dialed.

Figure 13:
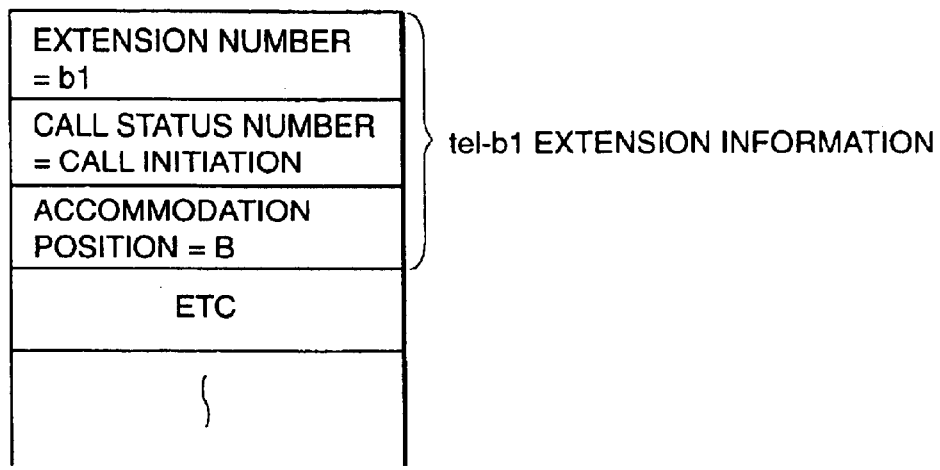
FIG. 13 is a diagram showing the extension number b1, the accommodation position B and the call state number, which are temporarily stored as call control data.

Further, in order to manage the extension terminal b1 under call processing, the central processing equipment 10 stores the extension number b1, the accommodation position B, the call status number (in this case, the call initiation), etc. as call control data into the call processing data area 132 of the main memory 11 while associating these data with one another as shown in FIG. 13.

Figure 14:
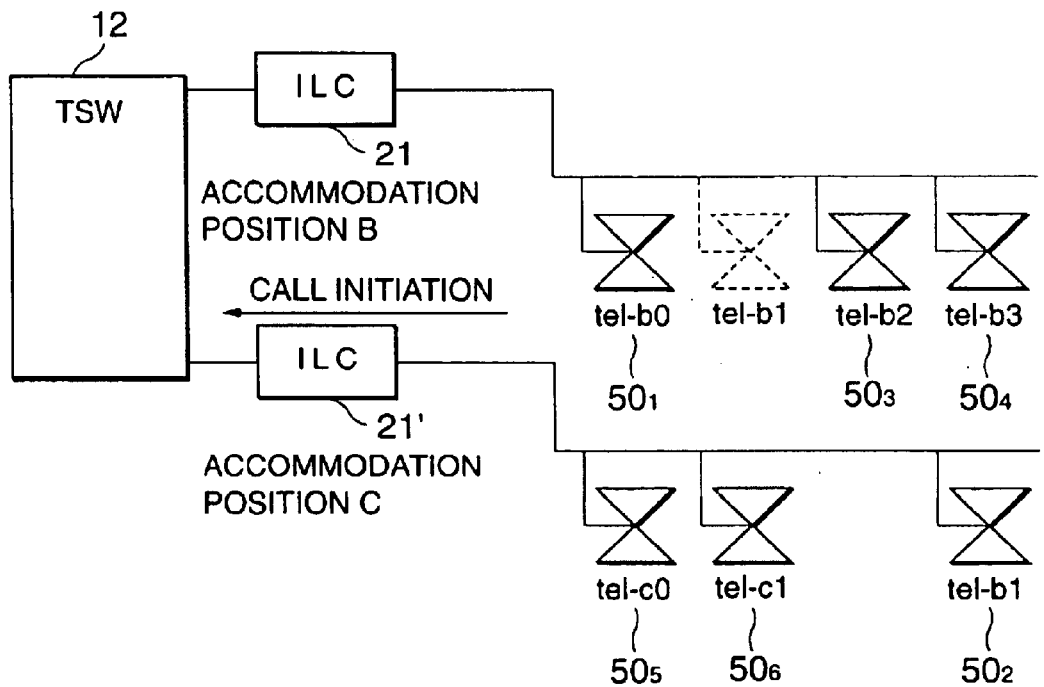
FIG. 14 is a diagram showing a state where a call is initiated from the ISDN extension terminal $50_2$ which is connected to an ISDN extension circuit 21' due to connection switching.

Next, it is assumed that the ISDN extension terminals $50_5$, $50_6$ to which the extension numbers c0, c1 are allocated as the extension number information are connected to each other in a point-multipoint mode through the ISDN line interface circuit 21' to which the accommodation position C is allocated as the accommodation position information, and there will be described the call processing for the call initiation from the ISDN extension terminal $50_2$ when the connection of the ISDN extension terminal $50_4$ to the ISDN line interface circuit 21 is switched to the connection thereof to ISDN line interface circuit 21' in the above state as shown in FIG. 14.

The ISDN line interface circuit 21' monitors the call initiation of the ISDN terminals $50_2$, $50_5$, $50_6$. When the ISDN extension terminal $50_2$ notifies the call initiation information containing the extension number b1 thereof to initiate a call as shown in FIG. 14, the ISDN line interface circuit 21' detects the call initiation and notifies the call initiation information to the central processing equipment 10 while the accommodation position C thereof is contained in the call initiation information thus received.

Upon receiving the call initiation information, the central processing equipment 10 executes the call processing program and goes to step S1 to judge whether the extension number is contained in the call initiation information thus received.

In this case, since the extension number b1 is contained in the call initiation information, the central processing equipment 10 goes to step S3 without executing the step S2, and it obtains the service class information (the communication connection class, the business/guest room class, the interrupt class, etc.) associated with the extension number b1 thus obtained from the extension number-service class information management table stored in the system establishment data area 131 of the main memory 11 as shown in FIG. 15.

Upon obtaining the service class information associated with the extension number b1, the central processing equipment 10 goes to step S4 to perform the call processing in accordance with the service class information thus obtained. For example, when the service class information thus obtained indicates the controls the connection to the public line, the ISDN extension terminal $50_2$ is connected to the communication partner only when the extension number is dialed.

Further, in order to manage the extension terminal b1 under call processing, the central processing equipment 10 stores the extension number b1, the accommodation position C, the call status number (in this case, the call initiation), etc. as call control data into the call processing data area 132 of the main memory 11 while associating these data with one another as shown in FIG. 16.

As described above, according to the present embodiment, when the extension number is contained in the call initiation information transmitted from the extension terminal, the service class information associated with the extent number concerned is searched from the extension number-service class information management table and the all processing is carried out in accordance with the service class information thus searched.

Accordingly, even when the plural extension terminals are connected to the exchange in the point-multipoint connection mode as shown in FIG. 1, the service class management for every extension terminal can be performed. Therefore, carefully thought out connection control and service control can be performed for every extension terminal.

Further, the service class management can be performed, not for every accommodation position, but for every extension terminal. Therefore, in the case where the private branch exchange accommodates the plural ISDN extension terminals in the plural point-multipoint connections as shown in FIG. 14, when an ISDN extension terminal accommodated through a point-multipoint connection is moved (connection-switched) so that it is accommodated through another point-multipoint connection, the service class management corresponding to the extension terminal concerned can be performed.

In the above embodiment, the ISDN extension terminals are used as extension terminals which can be connected in the point-multipoint connection mode, however, the present invention is not limited to this embodiment. Any extension terminal may be used insofar as the point-multipoint connection mode can be applied thereto.

As described above, according to the present invention, even when plural extension terminals are connected to an exchange in the point-multipoint connection mode, the service class management for every extension terminal can be performed.

What is claimed is:

1. A communication system comprising an exchange and plural ISDN (Integrated Services Digital Network) extension terminals accommodated in the exchange, wherein:
    said plural ISDN extension terminals are connected to said exchange in a point-multipoint connection mode through an ISDN interface,
    each of said ISDN extension terminals transmits call-initiation information containing identification information of said ISDN extension terminal when a call is initiated, and
    said exchange includes:
        storage means for storing a table representing corresponding relationship between the identification information of said ISDN extension terminal and service class information, and
        call processing means for searching the table to obtain service class information corresponding to the identification information of said ISDN extension terminal contained in the call-initiation information when the call-initiation information is received from said ISDN extension terminal via said ISDN interface, and performing call processing in accordance with the service class information obtained from the table.

2. A communication system comprising an exchange and plural ISDN (Integrated Services Digital Network) extension terminals accommodated in the exchange, wherein:
    said plural ISDN extension terminals are connected to said exchange in a point-multipoint connection mode through an ISDN interface,
    at least one of said plural ISDN extension terminals transmits call initiation information containing identification information thereof when a call is initiated, and
    said exchange includes:
        storage means for storing an accommodation position identification information management table representing corresponding relationship between an accommodation position and identification information of an ISDN extension terminal accommodated at the accommodation position concerned, and an identification information service class information management table representing the corresponding relationship between the identification information of said ISDN extension terminal and service class information, and
        call processing means for judging whether identification information of an ISDN extension terminal is contained in call initiation information when the call initiation information is received from said ISDN extension terminal via said ISDN interface, and searching the identification information service class information management table to obtain service class information corresponding to the identification information to perform call processing in accordance with the service class information obtained from the identification information service class information management table when the identification information of said ISDN extension terminal is contained in the call initiation information, or searching the accommodation position identification information management table to obtain the identification information of said ISDN extension terminal corresponding to an accommodation position at which the call initiation information is received from said ISDN extension terminal via said ISDN interface and searching the identification information service class information management table using the identification information obtained from the accommodation position identification information management table to obtain service class information to perform the call processing in accordance with the service class information obtained from the identification information service class information management table when the identification information is not contained in the call initiation information.

3. An exchange accommodating plural ISDN (Integrated Services Digital Network) extension terminals, wherein:
    said exchange is connected to said plural ISDN extension terminals in a point-multipoint connection mode through an ISDN interface, and said exchange comprises:
   storage means for storing a table representing corresponding relationship between identification information and service class information of each of said ISDN extension terminals, and
   call processing means for searching said table to obtain service class information corresponding to identification information of an ISDN extension terminal contained in call initiation information received from said ISDN extension terminal via said ISDN interface, and performing call processing in accordance with the service class information obtained from said table.

4. An exchange accommodating plural ISDN (Integrated Services Digital Network) extension terminals, wherein:
   at least one of said plural ISDN extension terminals transmits call-initiation information containing identification information when a call is initiated,
   said exchange is connected to said plural ISDN extension terminals in a point-multipoint connection mode through an ISDN interface, and
   said exchange comprises:
      storage means for storing an accommodation position identification information management table representing corresponding relationship between an accommodation position and identification information of an ISDN extension terminal accommodated at the accommodation position concerned, and an identification information service class information management table representing the corresponding relationship between the identification information of said ISDN extension terminal and service class information, and
      call processing means for judging whether identification information of an ISDN extension terminal is contained in call initiation information concerned when the call initiation information is received from each of said ISDN extension terminals via said ISDN interface, and searching the identification information service class information management table to obtain service class information corresponding to the identification information to perform call processing in accordance with the service class information obtained from the identification information service class information management table when the identification information of said ISDN extension terminal is contained in the call initiation information, or searching the accommodation position identification information management table to obtain the identification information of said ISDN extension terminal corresponding to an accommodation position at which the call initiation information is received and searching the identification information service class information management table using the identification information obtained from the accommodation position identification information management table to obtain service class information to perform the call processing in accordance with the service class information obtained from the identification information service class information management table.

5. A call processing method of extensions in an exchange in which plural ISDN (Integrated Services Digital Network) extension terminals are accommodated, wherein:
   said exchange is connected to said plural ISDN extension terminals in a point-multipoint connection mode through an ISDN interface, and
   said method comprises:
      a first step of detecting identification information of an ISDN extension terminal contained in call initiation information received from each of said ISDN extension terminals via said ISDN interface, and
      a second step of performing call processing in accordance with service class information which is predetermined in connection with the identification information thus detected.

6. A call processing method for an extension in an exchange in which plural ISDN (Integrated Services Digital Network) extension terminals are accommodated, wherein:
   at least one of said plural ISDN extension terminals transmits call-initiation information containing identification information identifying an ISDN extension terminal when a call is initiated,
   said exchange is connected to said plural ISDN extension terminals in a point-multipoint connection mode through an ISDN interface, and
   said method comprises:
      a first step of judging whether identification information of said ISDN extension terminal is contained in call initiation information received from each of said ISDN extension terminals via said ISDN interface, and
      a second step of performing call processing based on service class information predetermined in connection with identification information of said ISDN extension terminal if the identification information is contained in the received call initiation information, or searching to obtain identification information of said ISDN extension terminal predetermined in connection with an accommodation position at which the call initiation information is received and performing call processing in accordance with the service class information predetermined in connection with the identification information obtained by the search if no identification information is contained in the call initiation information.

* * * * *